United States Patent [19]

Yamaguchi et al.

[11] 3,978,317

[45] Aug. 31, 1976

[54] OPTICAL BAR CODE READER

[75] Inventors: Tetsuo Yamaguchi; Toshihide Hane, both of Yokohama; Seishi Sasaki, Hirakata; Shinzi Inoue, Yokohama; Shigemitsu Fukuyama, Yokohama; Kazunobu Tsutsumi, Yokohama, all of Japan

[73] Assignee: Matsushita Electric Industrial Co., Ltd., Osaka, Japan

[22] Filed: Feb. 24, 1975

[21] Appl. No.: 552,347

[30] Foreign Application Priority Data

| Feb. 26, 1974 | Japan | 49-23191 |
| Feb. 26, 1974 | Japan | 49-23200 |
| Mar. 4, 1974 | Japan | 49-25419 |
| Mar. 4, 1974 | Japan | 49-25421 |
| Mar. 4, 1974 | Japan | 49-25423 |

[52] U.S. Cl. ............. 235/61.11 E; 250/236; 356/71
[51] Int. Cl.² .................................. G06K 7/10
[58] Field of Search ............. 340/146.3 Z, 146.3 F; 356/71; 178/7.6; 250/233, 236, 566, 567; 235/61.11 E

[56] References Cited
UNITED STATES PATENTS

| 3,508,065 | 4/1970 | Holford | 250/566 |
| 3,566,080 | 2/1971 | Uffelman | 250/233 |
| 3,632,871 | 1/1972 | Watkins | 178/7.6 |
| 3,718,761 | 2/1973 | Myer | 178/7.6 |
| 3,818,444 | 6/1974 | Connell | 340/146.3 Z |
| 3,889,102 | 6/1975 | Dahlquist | 235/61.11 E |

*Primary Examiner*—John K. Corbin
*Assistant Examiner*—Wm. H. Punter
*Attorney, Agent, or Firm*—Stevens, Davis, Millr & Mosher

[57] ABSTRACT

An optical reader including a plurality of fixed mirrors disposed on an imaginary circumference, a light source for emitting a light beam, a rotating mirror receiving the light beam from the light source and directing the reflected light beam to the plurality of fixed mirrors successively so as to form a plurality of retarded scanning light beams projecting on an object, and photo-electric converter means for receiving lights reflected by the object and generating an electric signal. The optical reader does not require mechanical synchronization. Cleaner means may be provided to brush off dust from the surfaces of the fixed mirrors.

8 Claims, 20 Drawing Figures

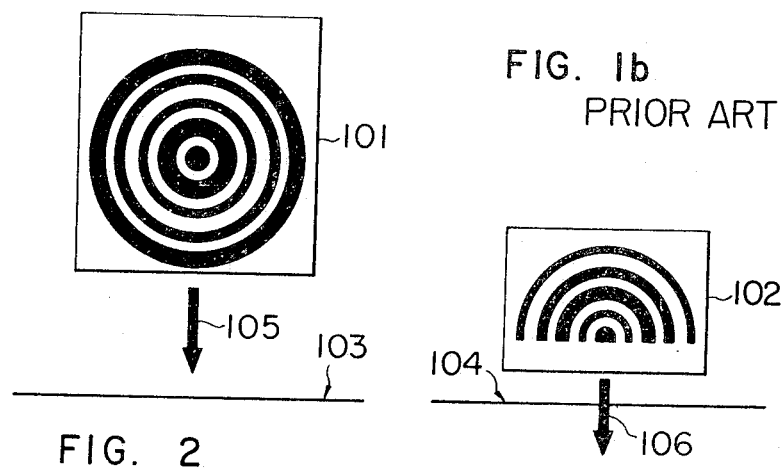
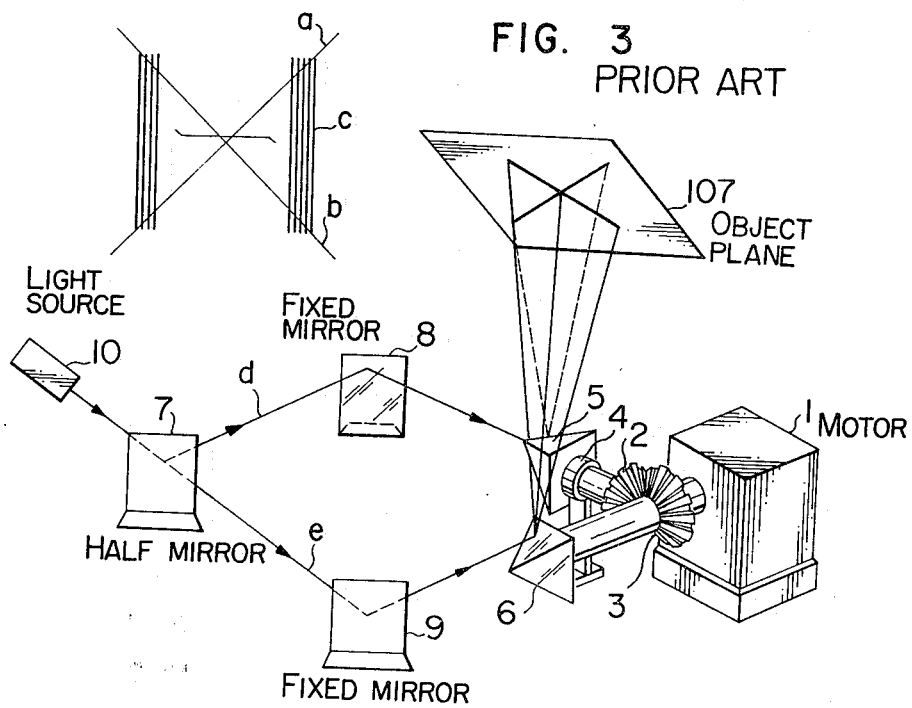

$(A' B' C' D' E' F' G') = (0\ 0\ 0\ 1\ 0\ 0\ 1)$

FIG. 9
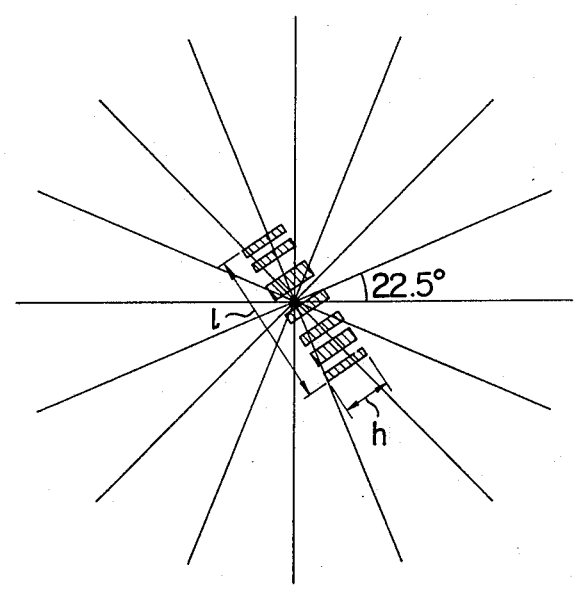
$$h = l \cdot \tan\frac{22.5°}{2} + \alpha$$
$$\alpha > 0$$
FIG. 10
(a) 
(b) 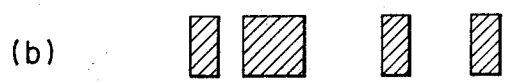

FIG. 15

| NUMERAL | 7 BIT CODE (A'B'C'D'E'F'G') | BAR CODE PATTERN (A' B' C' D' E' F' G') |
|---|---|---|
| 0 | 0 0 0 0 0 1 1 | 0 0 0 0 0 1 1 SPACE |
| 1 | 0 0 0 0 1 1 0 | 0 0 0 0 1 1 0 SPACE |
| 2 | 0 0 0 1 0 0 1 | 0 0 0 1 0 0 1 SPACE |
| 3 | 1 1 0 0 0 0 0 | 1 1 1 0 0 0 0 0 SPACE |
| 4 | 0 0 1 0 0 1 0 | 0 0 1 0 0 1 0 SPACE |
| 5 | 1 0 0 0 0 1 0 | 1 1 0 0 0 0 1 0 SPACE |
| 6 | 0 1 0 0 0 0 1 | 0 1 0 0 0 0 1 SPACE |
| 7 | 0 1 0 0 1 0 0 | 0 1 0 0 1 0 0 SPACE |
| 8 | 0 1 1 0 0 0 0 | 0 1 1 0 0 0 0 SPACE |
| 9 | 1 0 0 1 0 0 0 | 1 1 0 0 1 0 0 0 SPACE |
| a OR t | 0 0 1 1 0 1 0 | 0 0 1 1 0 1 0 SPACE |

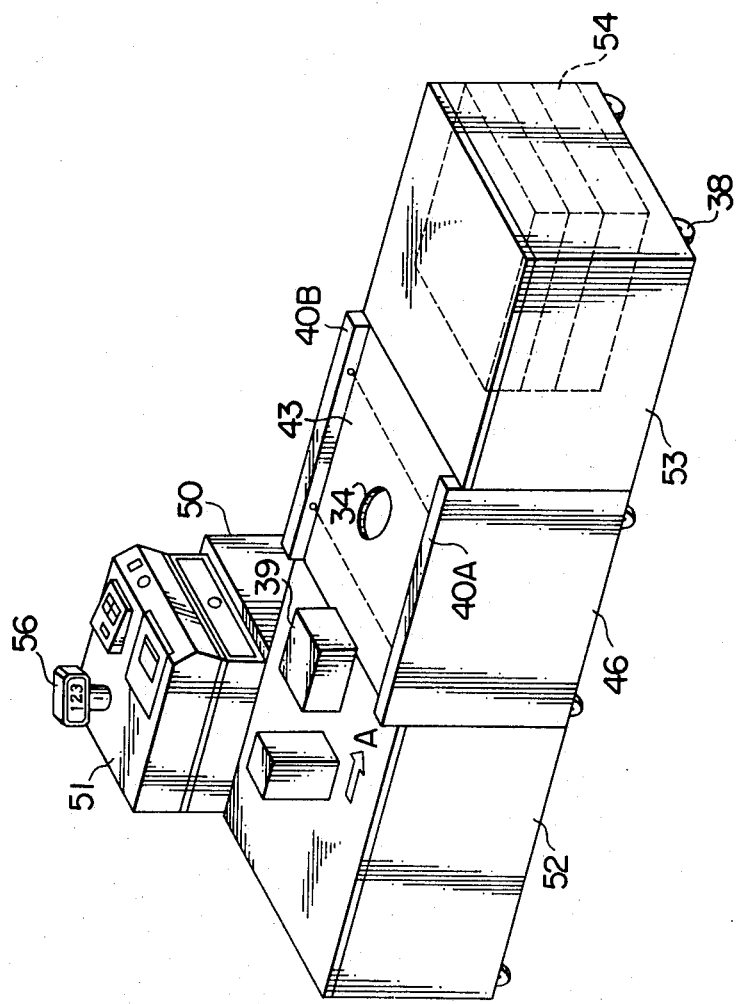

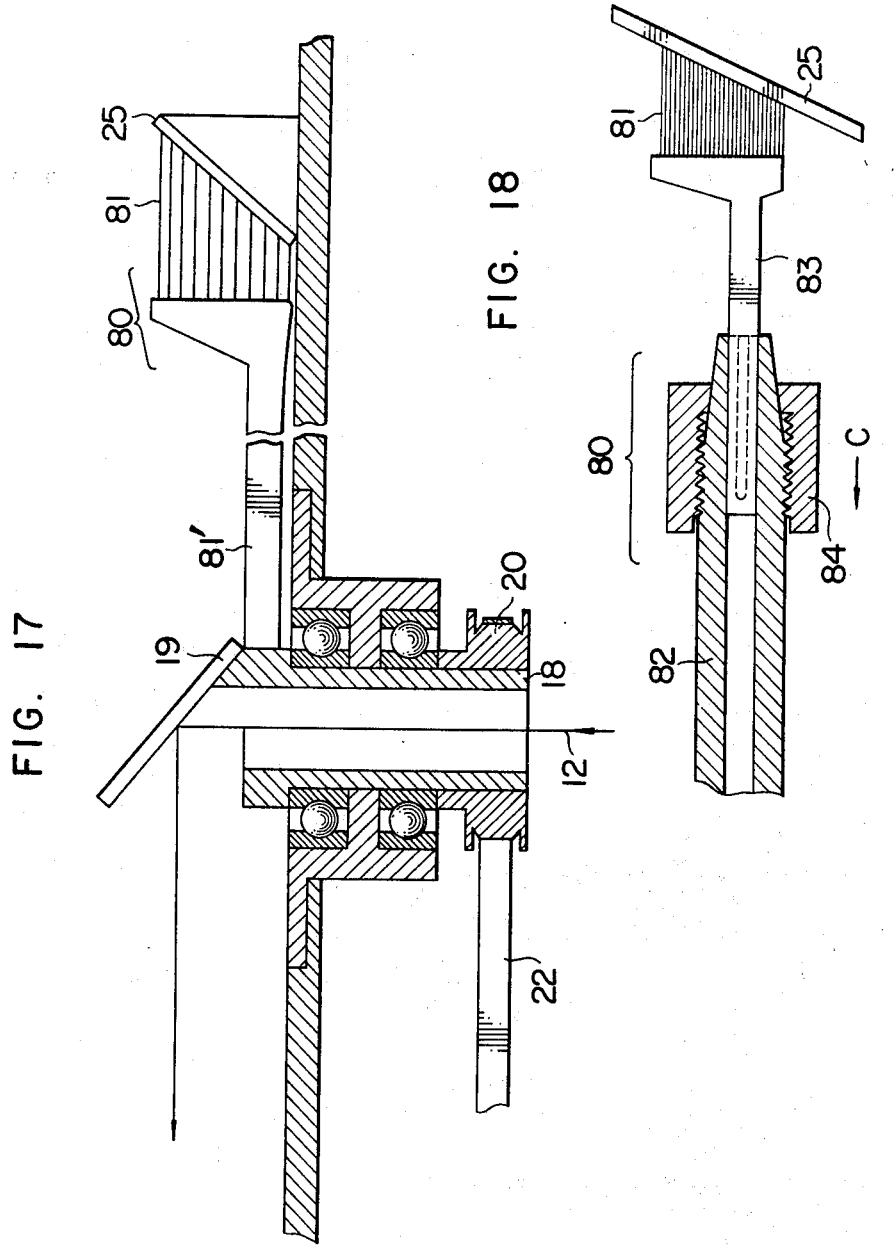

OPTICAL BAR CODE READER

This invention relates to an optical reader and more particularly to an optical reader provided with a light scanning system adapted for reading coded information, such as an automatic price card reader used in a shop front.

Recently, active development has been made in the point of sales (POS) system effective for automating sales receipts counting and information gathering and processing on the sales in a shop front. For the POS system, the automatic optical reader is an important apparatus for improving efficiency and accuracy. In an optical reader, an object to which coded information is affixed, such as those represented by a bar code consisting of bars and spaces or a concentric code consisting of concentric circles, is allowed to pass over an object plane on which a light beam, such as a laser light beam, etc., is scanned, and light reflected from the coded object is received and converted into an electric signal in a light detector to read the information. In such systems, various code shapes and scan patterns have been tried for enabling the read-out of coded object disposed on goods whatever direction the coded information has in the object plane.

Examples of the coded information are concentric circular and semicircular codes as shown in FIGS. 1a and 1b. In FIGS. 1a and 1b, a circular or semicircular code is printed on an object (price card, etc.) 101 or 102 and the object 101 or 102 is transported in the object plane in the direction indicated by an arrow 105 or 106 to pass over a linear scanning slit 103 or 104. In these cases, no matter how the relative direction of the object 101 or 102 with respect to the scanning slit is varied from that shown in the figure, the coded information can be correctly read out.

Another example of the coded information is the bar code as shown in FIG. 2. For enabling the read-out of such bar-coded information, the code is scanned in an X-shaped pattern and the ratio of the length of each bar to the total width of the bars is set to be no smaller than 1. In the figure, letters $a$ and $b$ represent scanning traces and $c$ a bar code.

An example of the conventional optical reader having an X-shaped scanning pattern is shown in FIG. 3, in which numeral 1 indicates a scanning motor, 2 and 3 interlocking bevel gears, 4 a bearing, 5 and 6 rotating mirrors for providing scanning light beams, 7 a half or semi-transparent mirror for dividing a light beam into two, 8 and 9 fixed mirrors for deflecting light beams, and 10 a light source for emitting a light beam. A light beam emitted from the light source 10 projects onto the half mirror 7 and is divided into two beams $d$ and $e$ which are reflected by the fixed mirrors 8 and 9 and then by the rotating mirrors 5 and 6, respectively, to perform X-shape scanning on an object plane 107.

Such a conventional system has the drawbacks that the manufacture of the coded object is not easy and/or that the dimensions of the coded object becomes large. Further, according to the conventional system, one rotating mirror is used for each linear scanning trace.

For reducing the height of each bar with respect to the total width of bars in the bar code system, it may be easily thought of to increase the number of scanning traces crossing at a common point so as to divide a scanned area with more linear segments and to form an acuter angle with neighboring segments. When this concept is developed according to the conventional system as described above to increase the number of scanning traces to $n$ lines ($n$ is integer), since one half mirror can increase the number of beams by one, ($n-1$) half mirrors will be needed if half mirrors are adopted and one light source is used. This leads to a large reduction of the light intensity for each beam.

This invention is to provide an optical reader comprising a light scanning system for scanning a multiplicity of scanning traces of linear shape with only one rotating mirror.

An object of this invention is to provide an optical reader capable of reading a smaller object carrying coded information, such as a price card, regardless of the direction of the object.

Another object of this invention is to provide an optical reader having and extremely small possibility of radiating a scanning light to the outside.

A further object of this invention is to provide an optical reader free from the adverse effects of dust and dirt.

According to an embodiment of this invention, there is provided an optical reader for reading coded information objects disposed on goods regardless of the direction of the objects, comprising, a light source for emitting a light beam, a plurality of fixed mirrors disposed on an imaginary circumference, a rotary mirror disposed at the center of said imaginary circumference for directing the light beam from said light source to said plurality of fixed mirrors, drive means for rotating said rotary mirror, a transparent reading area over which goods carrying coded information pass, the angles of said rotary mirror and said fixed mirrors being so arranged that the light beam reflected from said rotary mirror and then by said fixed mirrors is directed to said transparent reading area to form scanning traces crossing at a common point to the rotation of said rotary mirror, photoelectric converter means for receiving light reflected by said object of coded information and generating an electric signal, and decoder means for decoding the coded information from said electric signal derived from said photo-electric converter means.

According to another embodiment of this invention, there is provided an optical reader of said structure further comprising cleaner means coupled to said rotary mirror for cleaning said fixed mirrors. According to this invention smaller objects such as coded price cards than those used in the conventional optical readers can be read out with a simple mechanism regardless of the direction of the price cards. Further, since an optical shutter is opened only when goods pass through a reading area, there is very little possibility of leaking the light beam to the outside and hence a light source which may be harmful to the human body may be used. Yet further, cleaner means is provided on the rotating support for the rotating mirror and hence fixed mirrors are always cleaned. This prevents the occurrence of irregular reflection (scattering) of the light beam and hence the lowering of light intensity due to dust on the mirror surfaces and warrants correct reading performance. Further, there is no need for an extra drive source for the cleaner means since it is attached on the rotating support for the rotating mirror.

Other objects, features, and advantages of this invention will become apparent from the following detailed description on the preferred embodiments taken in conjunction with the accompanying drawings, in which:

FIGS. 1a and 1b are schematic illustrations of concentric circular and a semicircular codes to be read with a linear slit used in conventional optical readers;

FIG. 2 is a schematic illustration of a bar code and an X-shaped scanning trace used in conventional optical readers;

FIG. 3 is a schematic diagram of the conventional optical system for performing the X-shaped scanning;

FIG. 9 is a schematic illustration of the relative relation of the scanning traces and a bar code in the optical reader of this invention;

FIG. 10 is diagrammatic representation of a code pattern and a corresponding output signal of a photoelectric converter;

FIG. 15 is a diagram showing bit structures for digits and marks;

FIG. 16 is a perspective view of a register provided with an optical reader;

FIG. 17 is a cross-sectional side view of cleaner means provided in an optical reader according to this invention;

FIG. 18 is a cross-sectional view of the mount portion of the cleaner means of FIG. 17.

Figure 4:
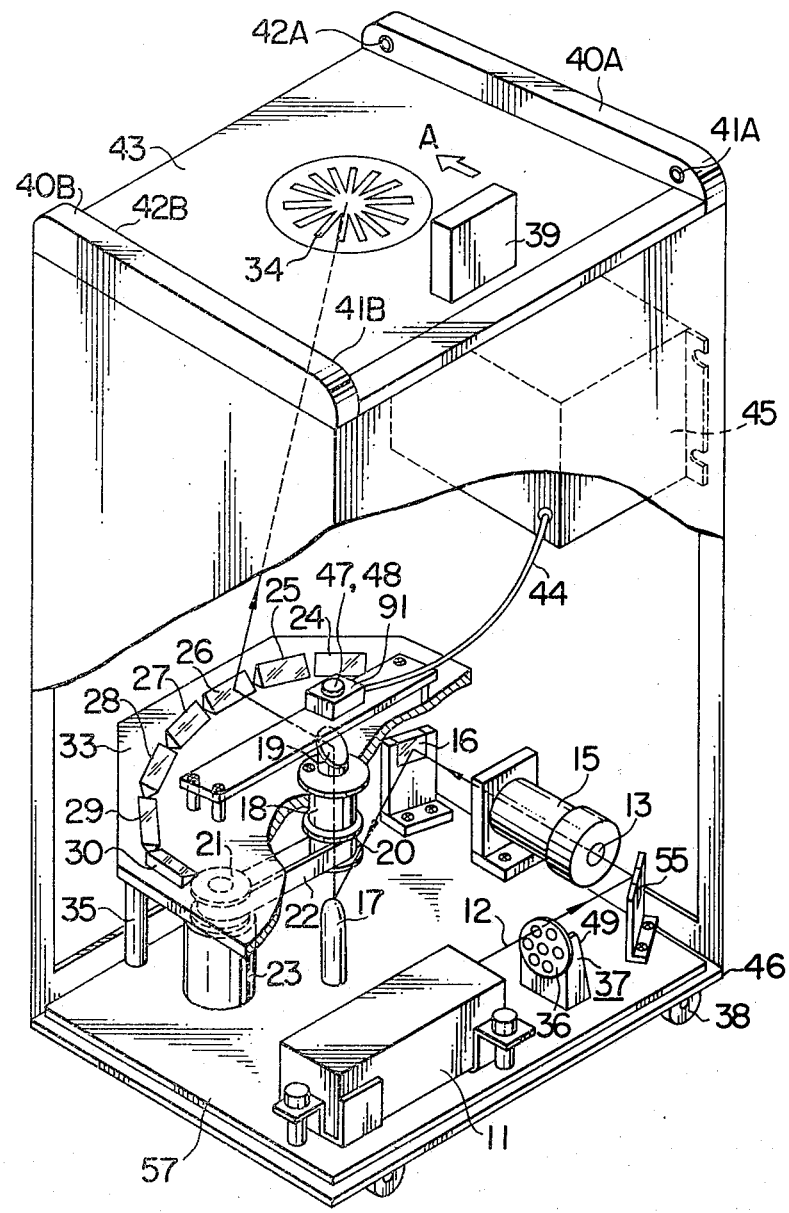
FIG. 4 is a perspective view of an embodiment of the optical reader according to this invention.
Figure 5:
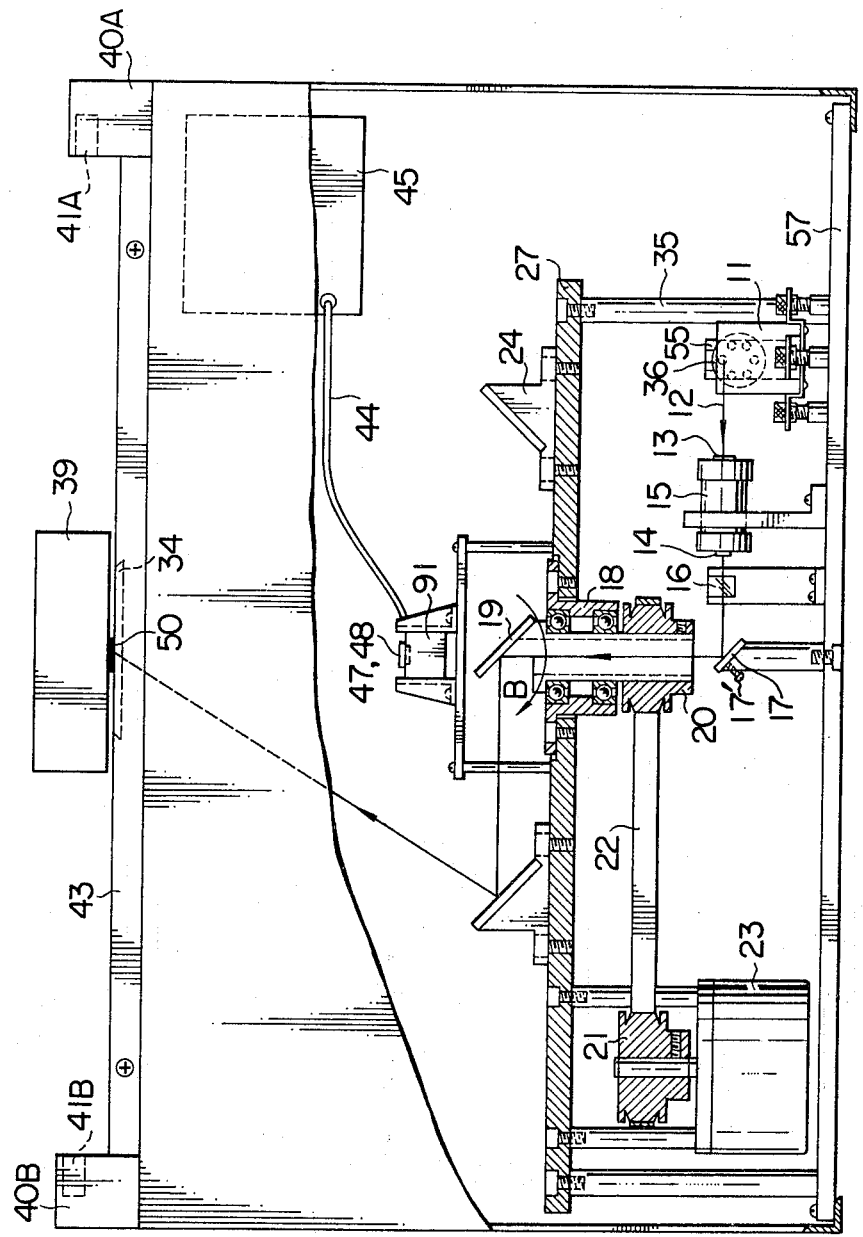
FIG. 5 is a cross-sectional side view of the optical reader of FIG. 4.

An embodiment of an optical reader for coded patterns is shown in FIGS. 4 and 5. First, the optical path for the scanning beam will be described. A light beam 12 emitted from a light source 11 is directed to a shutter 37 consisting of a shutter disk 36 provided with several transparent or through windows and mounted on a shaft of a pulse motor 49 which rotates by a certain angle upon receipt of a triggering pulse. This shutter means 37 minimizes the possibility of radiating the light beam to the outside which may be harmful to the human body. The shutter means 37 is controlled by goods detecting photocouplers 41A – 41B and 42A – 42B each of which may consist of an infrared beam emitting diode and a phototransistor and detects the passage of goods across the line 41A – 41B or 42A – 42B. When goods 39 pass across the line 41A – 41B, a pulse signal is supplied to the pulse motor 49 to rotate the disk 36 by a predetermined angle to allow the passage of the light beam 12 emitted from the light source 11. Namely, when goods pass through the line 41A – 41B in the direction indicated by arrow A, the light beam 12 passes through the shutter means 37, is then reflected by a plane mirror 55 and reaches the lens system 13 and 14 for focusing the beam on the object plane 43. The lens 13 may be a collimating lens and the lens 14 may be a focusing lens. The lenses 13 and 14 are aligned coaxially and supported in a telescopic cylinder 15. The converging light beam from the lenses 13 and 14 is reflected by fixed mirrors 16 and 17 to impinge on a rotating mirror 19. A fine adjustment screw 17' is provided for the mirror 17 to adjust the direction of the reflected light beam, i.e., vertical direction. Above the mirror 17, a rotating mirror 19 is mounted on a cylinder 18 rotated by a motor 23 in the direction indicated by arrow B. Thus, the light beam impinging on the deflecting mirror 19 is reflected to project in a radial direction and the progressing direction of the reflected beam rotates in a horizontal plane in this embodiment. The driving force of the motor 23 is transmitted to the deflecting mirror 19 through pulleys 21 and 20 mounted on the shaft of the motor 23 and on the cylinder 18 and through a belt 22. The rotating light beam from the deflecting mirror 19 is projected on fixed mirrors 24 to 30 disposed on an imaginary circle on a support plate 33 and reflected to focus on vacant or transparent portions 34 in the object plane 43. The fixed mirrors 24 to 30 are fixed on a support plate 33 which is fixed to a substrate 57 through legs 35.

Figure 6:
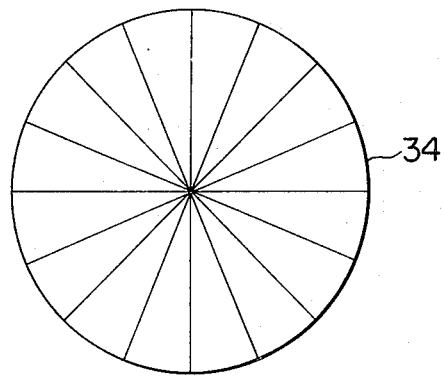
FIG. 6 is a schematic diagram of the scanning traces in an optical reader according to an embodiment of this invention.

The traces of scanning beams on the reading area 34 in the object plane 43 is shown in FIG. 6. Across this trace pattern, a price card 50 adhered on goods 39 is allowed to pass.

Figure 7:
FIG. 7 is a plan view of an example of a bar code consisting of bars and spaces to be used for the optical reader of this invention.
Figure 8:
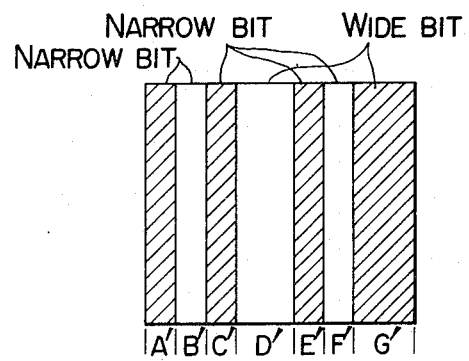
FIG. 8 is a plan view of an example of one character of the bar code.

FIG. 7 shows an example of the price card and FIG. 8 shows bits of a code constituting a price card. Here, each character of the code consists of four bars and three spaces. Each of these bars and spaces is thin or thick and represents a bit. A thick bit has a width at least twice as wide as a thin bit. Each bit can be discriminated by detecting the width of the bar or space. Here, we assume that a narrow bit represents 0 and a wide bit 1. Then, the 7 bit code of FIG. 8 represents (A'B'C'D'E'F'G') = (0001001). Here, we also assume that this combination of bits represents "2" in this embodiment.

In this embodiment, the number of scanning traces is eight so that the total reading area is divided into 16 sections. Thus, one section is defined by lines crossing at an angle of 360°/16 = 22.5°. For reading codes of any direction with said scanning traces, the required ratio of the height $h$ to the width $l$ of a price card carrying such coded information is $$h = l \cdot \tan(22.5°/2) + \alpha, \ \alpha > 0.$$

When this condition is satisfied, at least one scanning line in the scanning traces can read the full code of a price card 50 regardless of the direction of the price card, as is shown in FIG. 9.

The surface of the price card 50 is formed of a diffusing surface and hence the light beam projecting thereon is diffusedly reflected or scattered by the price card in the reading area 34 and enters a photo-detector 91 through a diffuser plate 47 and a narrow pas interference filter 48. The photo-detector may be formed of a photomultiplier and transforms the intensity of the received light into an electric signal to generate an output signal as shown by curve (a) in FIG. 10. The pattern shown by (b) in FIG. 10 represents the original pattern of the code corresponding to the output of curve (a) of FIG. 10. The photo-detector 91 is preferably set at a position where the normal or specular reflection from a price card on the object plane does not enter the detector to avoid too large variations of the light signal intensity due to the variation of the location of a price card. The output signal of the photo-detector 91 is supplied to a signal discriminator 45 through a cable line 44. The discriminator 45 discriminates the coded information on the price card and displays the result on display means or enters the result in a register to record it.

Figure 11:
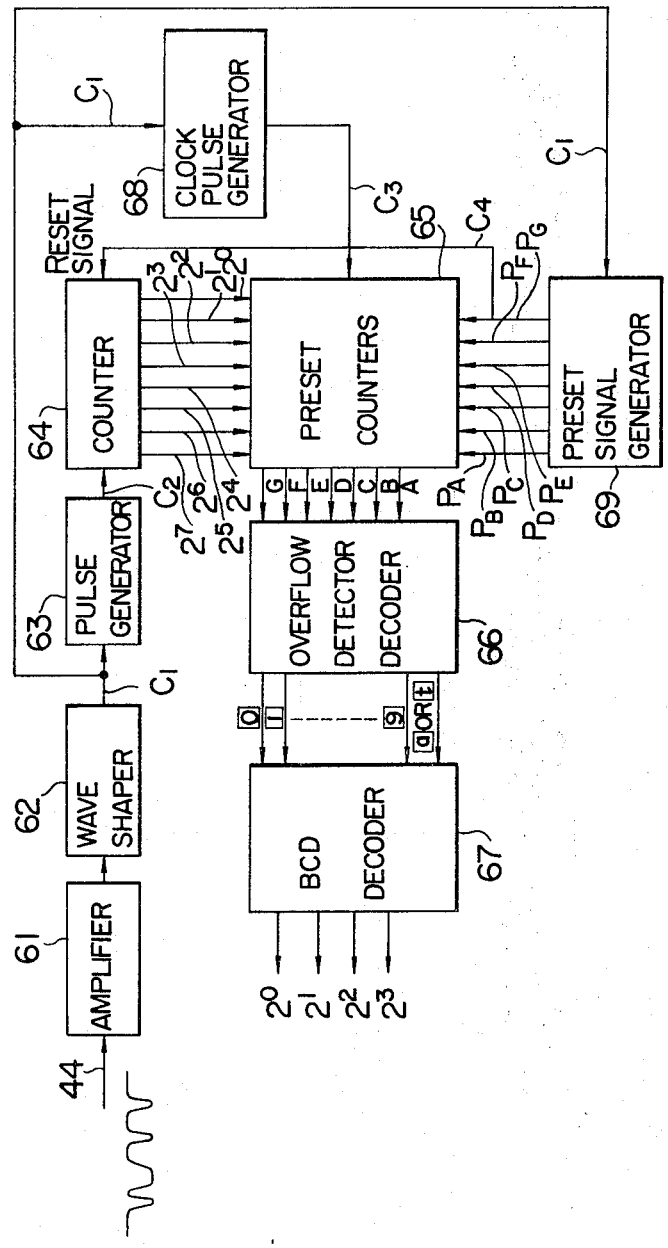
FIG. 11 is a block diagram of a signal discriminator circuit.

Next, the discriminator 45 will be further described in detail. FIG. 11 shows the circuit structure of the discriminator 45. In the figure, numeral 61 indicates an amplifier circuit for amplifying the output of the photo-detector 91, 62 a waveform shaping circuit, 63 a pulse generator, 64 a counter circuit for counting pulses generated from said pulse generator 63, 65 a group of preset counters including seven preset counters A to G, 66 an overflow detecting and decoding circuit for the group of preset counters, 67 a BCD (binary coded decimal) decoder circuit, 68 a clock pulse generator circuit, and 69 a preset signal generator circuit.

Figure 12:
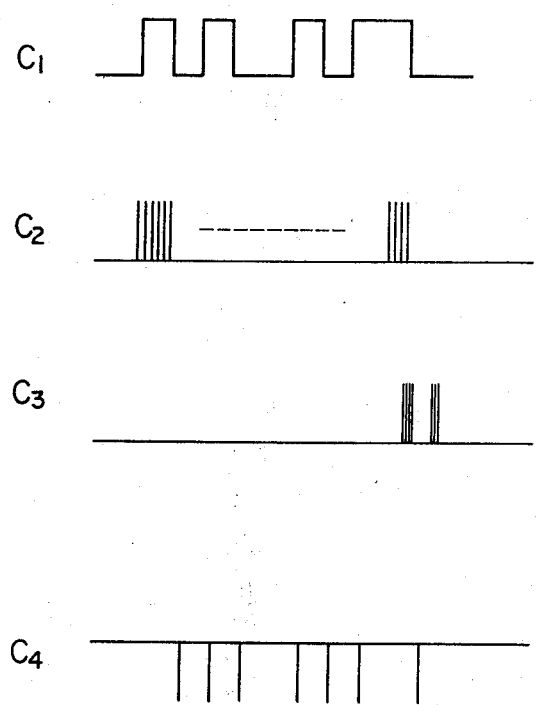
FIG. 12 is a timing chart of the output signals of the main portions of the signal discriminating circuit of FIG. 11.

The output of the photo-detector 91 as shown in FIG. 10 is amplified in the amplifier 61 and then the waveform of the amplified signal is shaped in the waveform shaper 62. The output signal C1 of the waveform shaper 62 is supplied to the pulse generator 63, the clock pulse generator 68 and the preset signal generator 69 to provide respective outputs C2, C3 and C4. FIG. 12 is the timing chart for these outputs C1, C2, C3 and C4. The output C1 of the waveform shaper 62 represents the bar portions and space portions by its level. The output C2 of the pulse generator 63 is a pulse train generated when a code, i.e., a bar or a space, is read. The output C3 of the clock pulse generator 68 is generated after one character consisting of 7 bits is read out. Finally, the output C4 of the preset signal generator 69 is generated after each bit is read out and works as presetting signals for the group of preset counters 65 and as the resetting signal for the counter circuit 64.

In the counter circuit 64, the width information for each bit is counted from the pulse signal C2 with the aid of the reset signal C4 to provide 8 bit binary outputs supplied to the preset counters 65. The width information of the respective bits are successively stored in the preset counters 65.

Figure 13:
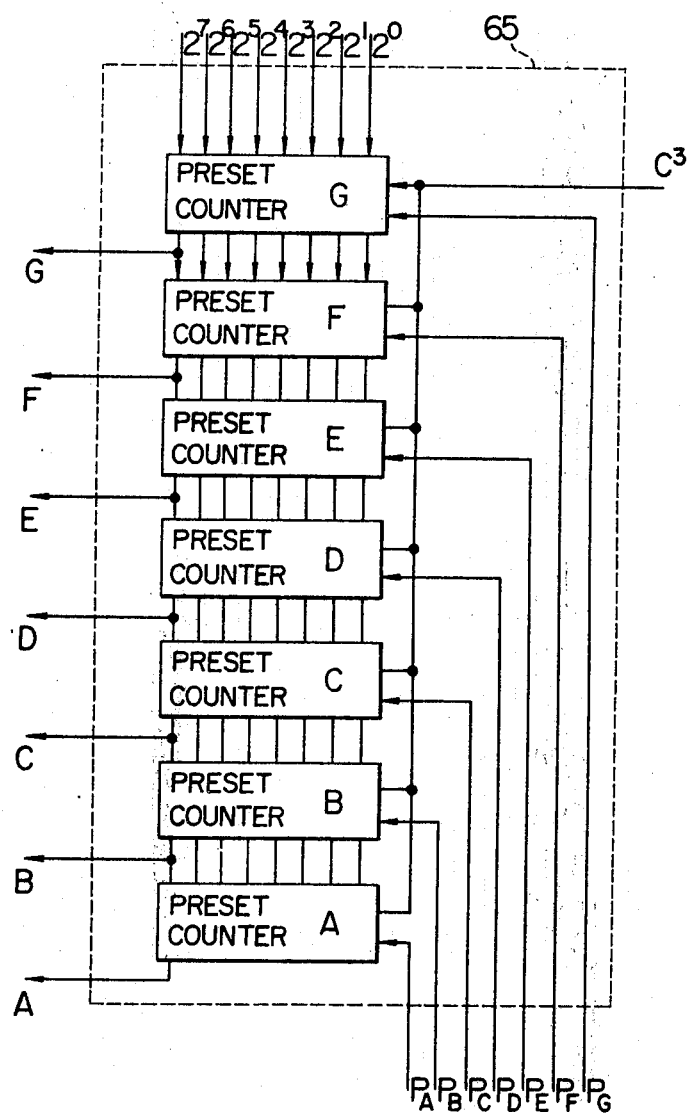
FIG. 13 is a block diagram of a detailed circuit of preset counters in a main portion of the signal discriminating circuit of FIG. 11.

FIG. 13 shows a detailed circuit for the group of preset counters 65. The width information for respective bits (e.g. A', B', C', D', E', F', G' of FIG. 8) is converted into digital quantities in the counter circuit 64 and successively supplied to a preset counter G. The stored information is then shifted successively as in the manner G → F → E → D → C → B → A. Thus, when 8-bit information is supplied from the counter 64, respective data A', B', C', D', E', F', G' of the 8-bit information are stored in the preset counters A, B, C, D, E, F, G, respectively. When one character is stored as is described above, the pulse signal C3 is supplied smultaneously to seven preset counters A to G. Upon receipt of this pulse signal, the preset counters A to G supply overflow signals. Here, if the preset value is large, the corresponding overflow signal is generated earlier. Namely, in the case of the code shown in FIG. 8 (A'B'C'D'E'F'G') = (0001001), since the bits D' and G' are respectively "1" while the other bits are "0," the preset counters D and G store larger values and supply overflow signals earlier than other preset counters when the pulses C3 are supplied.

Figure 14:
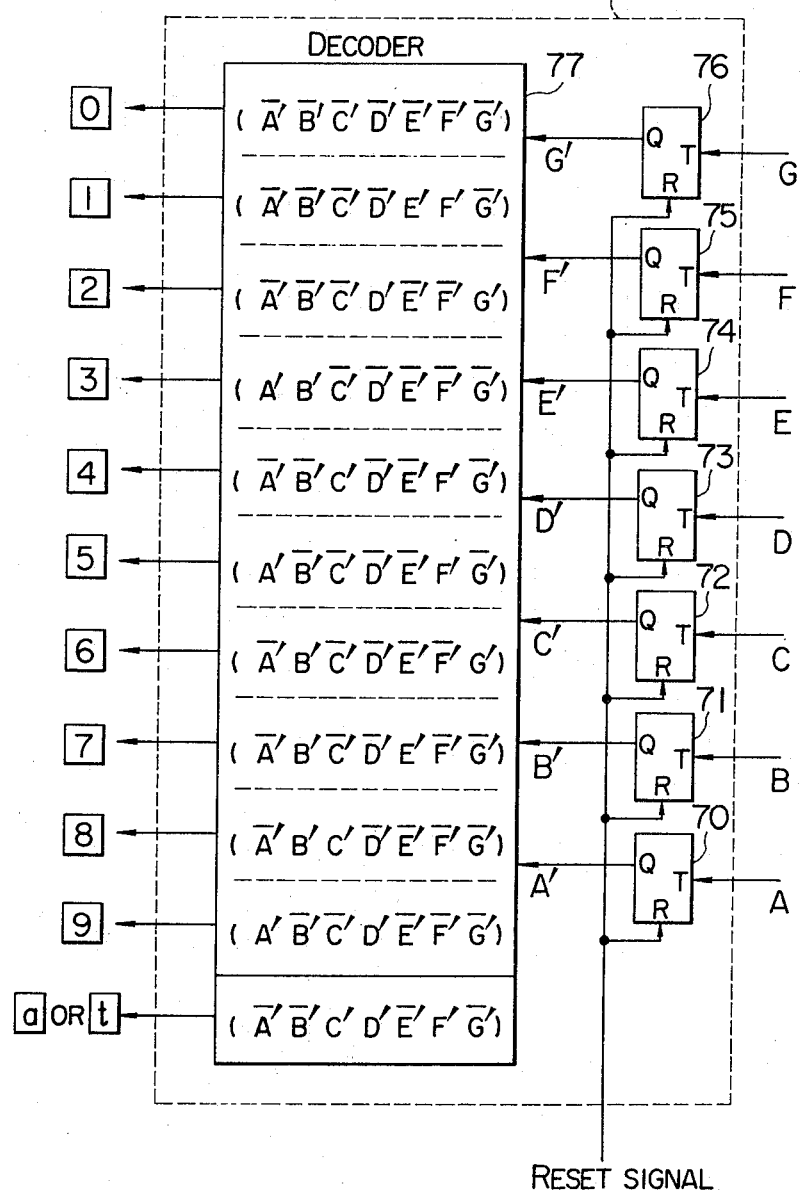
FIG. 14 is a block diagram of a detailed circuit of a decoder.

These output signals enter the overflow detecting and decoding circuit 66 which is shown in detail in FIG. 14. In the figure, numerals 70 to 76 indicate bistable multivibrators and 77 a decoder. The overflow outputs D and G are stored in the bistable multivibrators 73 and 76 and then supplied to the decoder 77 as the output signals D' and G'. The decoder 77 takes the logic product of the signals A', B', C', D', E', F', and G'. In this case, from the logic product of the outputs D', G' (logic 1) and those $\overline{A'}$, $\overline{B'}$, $\overline{C'}$, $\overline{E'}$, $\overline{F'}$ (logic 0), an output "2" can be detected. Here, the decoder 77 includes the logic circuits for respective digits and "a" or "t."

The detailed pattern structures for respective digits and a or t are shown in FIG. 15. As can be seen from these patterns, for digits 0 to 9 the number of wide bits 1 in the 7 bit structure is always two and that of narrow bits is five. Letter a or t is usually a start code and an end code which also works as a check code for correct discrimination. In this case, the number of wide bits 1 is three. Thus, in this embodiment discrimination of a signal is done when three overflow outputs are supplied from the preset counters. The signal detected in this way is converted into a 4-bit BCD code in the BCD decoder 67 to generate an output ($2^0$, $2^1$, $2^2$, $2^3$).

Goods carrying a code having been read out at the price card reading section then pass through the goods detecting photocoupler 42A – 42B to provide an output. This output rotates the shutter disk 36 by a predetermined angle to shut off the light beam. This output also triggers the transfer of the read-out information to another apparatus requiring this information, e.g., a cash register in a shop front of a supermarket or a department store.

Guide members 40A and 40B located at both sides of the object plane 43 prevent the falling-down of goods 39 while the goods 39 are being transferred. The two sets of goods detectors 41A – 41B and 42A – 42B are disposed in these guide members. Further, for easily moving the apparatus, casters 38 are provided on the lower surface of a housing 46 of the apparatus.

Although two sets of goods detectors 41A – 41B and 42A – 42B are used in the above embodiment, the goods detector 42A – 42B may be dispensed with. In such case, when a signal is detected which means that a proper discrimination has been made, e.g., the read-out signal of the discriminator 45, the shutter disk 36 is rotated by a predetermined angle to shut off the light beam 12.

FIG. 16 shows an embodiment of the optical reader for use in a supermarket or a department store. Goods 39 are placed on a table 52. An operator of the apparatus moves the goods 39 in the direction of arrow A by hand to let the price card pass through the reading area 34. The price card attached to the goods 39 is read out optically and the read-out information is sent from a discriminator 45 in a housing 46 to a connected cash register 51. Numeral 56 represents a rotary display means, and 50 a table for mounting the body of the cash register 51. The read-out goods 39 are packed on a table 53 automatically. Boxes 54 contain paper bags for automatic packaging.

If dirt or dust is deposited on mirror surfaces of said embodiment, the reflectivity of the mirrors naturally decreases and irregular reflections increase so as to decrease the light intensity projected on price cards and to lower the S/N ratio of the detected signal. These factors may affect the reading performance of the apparatus. In the next embodiment, a cleaner means is provided in the apparatus to prevent such drawbacks.

FIG. 17 shows another embodiment provided with cleaner means which is attached to a rotating support 18 for a rotating mirror 19 at a position not disturbing the optical path of the beam, i.e., outside the optical path. In FIG. 17, the rotating support 18 for the rotating mirror 19 is driven by a motor 23 through a belt 22 and pulleys 20 and 21 as in the case of FIGS. 4 and 5. A light beam projecting through the rotary support 18 to a rotary mirror 19 is reflected at the mirror 19 and proceeds in a radial direction perpendicular to the axis of the rotary suport 18. Since the mirror 19 is being rotated, the reflected beam also rotates in a plane perpendicular to the rotation axis and scans fixed mirrors 25, . . . located on an imaginary circumference on said plane. The light beam reflected by the respective fixed mirrors 25, . . . scans respective trace lines crossing at a common point. These scanning traces work to read out a price card 50 positioned on the reading area 34.

Figure 19:
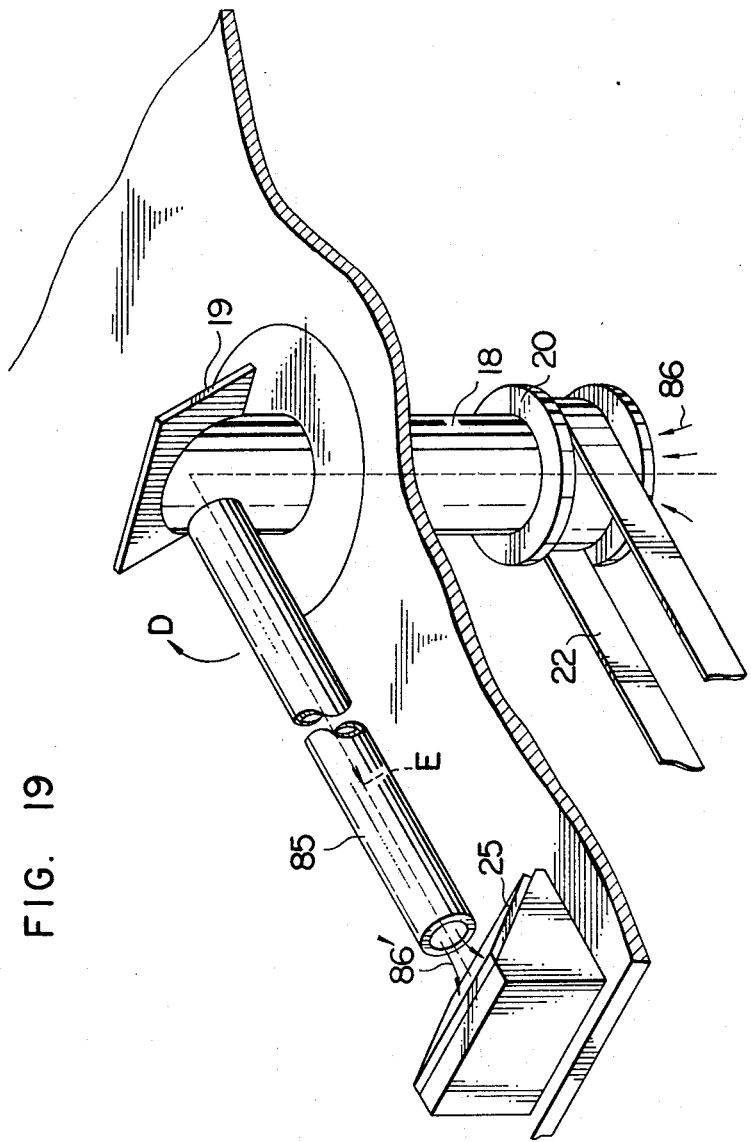
FIG. 19 is a perspective view of another embodiment of cleaner means according to this invention.

FIGS. 17, 18 and 19 show details of cleaner means 80. The cleaner means 80 shown in FIG. 17 consists of a soft brush 81 and an arm 81' supporting the brush 81 at one end and mounted to the rotating support 18 at another end. The brush is positioned to softly touch the surfaces of the respective mirrors 25, . . . The cleaner means 80 is so arranged not to disturb the optical path of the scanning beam. Further, the cleaner means 80 is provided in a detachable manner.

FIG. 18 shows one way of loading and detaching a cleaner member. The cleaner means 80 comprises a support cylinder 82 having one end fixed to the rotating support 18 for the rotating mirror 19, a brush 83 detachably loaded in said support cylinder 82 and a cap nut 84 connecting said cylinder 82 and said brush 83. On the tip portion of said cylinder to be coupled with said brush, a taper and a screw are formed outside and cutaway portions shown by broken line are formed to reach the inside hollow portion for inserting the brush 83 therein. When the brush 83 is inserted into the inner hollow portion of the support member 82 and the cap nut 84 is fastened, the cap proceeds in the direction of arrow C and fixes the brush 83 through the tapering portion by the existence of the cutaway portions. According to this system, the brush 83 can be easily loaded and detached. Further, when the distance between the rotating mirror 19 and the fixed mirrors 25, . . . is varied or the brush tip is worn off, the brush position can be easily adjusted so as to lightly touch the fixed mirrors 25, . . .

Although the above method is very useful, the brush tip mechanically touches the mirror surface and may form fine scratches on the mirror surface in long use. A safe way to clean the mirror surface is by blowing air onto the mirror surface. FIG. 19 shows another embodiment of cleaner means adopting air blast according to this system, no portion of the cleaner means directly touches the mirror surfaces and there is no danger of damaging the mirror surface. In FIG. 19, an air guide 85 consisting of a hollow cylinder is hermetically attached on an aperture portion of the rotating support 18 for the rotating mirror 19. The other end of this air guide 85 is arranged to have a smaller inner diameter. Further, since air is transparent for the light beam, the position of the air path is not limited outside the optical path in contrast to the case of using a brush. Namely, the air path may be the same as the optical path as is shown in FIG. 19. Other portions indicated by similar numerals in the figures are similar to those described before.

Next, the principles of cleaning the mirror surfaces with an air blast will be described hereinbelow. An air flow generated by a fan or the like is directed as is indicated by arrows 86. Then, the air flow passes through the insides of the rotating support 18 and the air guide 85 and blows the surfaces of the fixed mirrors 25, . . . Dust on the mirror surfaces is blown off by this air pressure. Further, to balance the system for rotation, a balancer weight or another air duct of similar structure may be attached on the opposite side of the rotating support 18.

According to the above embodiments, the fixed mirrors can be automatically and always cleaned while the rotating support 18 keeps rotating.

What is claimed is:

1. Apparatus for optically reading coded information on goods regardless of the orientation of the coded information, comprising:
   a light source for emitting a light beam;
   a transparent reading area over which goods carrying coded information pass;
   a plurality of fixed rectangular mirrors having their longitudinal axes disposed approximately on an imaginary circumference;
   a rotary mirror having a single reflecting plane disposed at the center of said imaginary circumference for directing the light beam from said source to said plurality of fixed mirrors, the angles of said rotary and fixed mirrors being arranged such that the light beam reflected from said rotary and fixed mirrors is directed to said transparent reading area to form a plurality of scanning traces crossing at a common point;
   drive means for rotating said rotary mirror;
   photo-electric converting means for detecting a reflected image of said coded information and generating an electric signal corresponding to said coded information; and
   decoder means coupled to said photo-electric converting means for decoding said coded information from said electrical signal.

2. An optical reader according to claim 1, further comprising a hollow support member for mounting said rotary mirror, said drive means rotating the rotary mirror through said hollow support member, and means for directing the light beam from said light source to said rotary mirror through the hollow portion.

3. An optical reader according to claim 2, further comprising air blast means for blowing air disposed near one end of said hollow support member opposite the mirror mounting end, and means for blowing air from a portion of said hollow support member near the mirror mounting end to said fixed mirrors.

4. Apparatus for optically reading coded information on goods regardless of the orientation of the coded information, comprising:
   a light source for emitting a light beam;
   a transparent reading area over which goods carrying coded information pass;
   a plurality of fixed mirrors disposed on an imaginary circumference;
   a rotating mirror disposed at the center of said imaginary circumference for directing the light beam from said source to said plurality of fixed mirrors, the angles of said rotating and fixed mirrors being arranged such that the light beam reflected from said rotating and fixed mirrors is directed to said transparent reading area to form scanning traces crossing at a common point;

photo-electric converting means for detecting a reflected image of said coded information and generating an electrical signal corresponding to said coded information;

decoder means coupled to said photo-electric converting means for decoding said coded information from said electrical signals;

detector means for detecting the presence of goods carrying said coded information and for generating first and second control signals representing the beginning and completion of a scanning period; and means coupled to said detector means for opening and closing a light path between said source and said reading area upon the occurrence of said first and second control signals, respectively.

5. The apparatus according to claim 4, wherein said detecting means comprises first detecting means for detecting the entry of goods carrying said coded information to said reading area and generating said first control signal, and second detecting means for detecting an output from said decoder means upon completion of reading said coded information and generating said second control signal.

6. Apparatus for optically reading coded information on goods regardless of the orientation of the coded information, comprising:

a light source for emitting a light beam;
a transparent reading area over which goods carrying coded information pass;
a plurality of fixed mirrors disposed on an imaginary circumference;
a rotating mirror disposed at the center of said imaginary circumference for directing the light beam from said source to said plurality of fixed mirrors, the angles of said rotating and fixed mirrors being arranged such that the light beam reflected from said rotating and fixed mirrors is directed to said transparent reading area to form scanning traces crossing at a common point;
photo-electric converting means for detecting a reflected image of said coded information and generating an electrical signal corresponding to said coded information;
decoder means coupled to said photo-electric converting means for decoding said coded information from said electrical signals; and
cleaner means coupled with said rotating mirror for cleaning said fixed mirrors.

7. The apparatus according to claim 6, further comprising:

a hollow support member for mounting said rotating mirror;
air blast means for blowing air disposed near one end of said hollow support member opposite the mirror mounting end; and
means for blowing air from a portion of said hollow support member near the mirror mounting end to said fixed mirrors.

8. An optical reader according to claim 6, in which said cleaner means comprising a support arm and a brush including a multiplicity of soft brush members planted on said support arm so as to brush through the surfaces of said fixed mirrors with the rotation of said rotary mirror.

* * * * *